(12) United States Patent
Liu et al.

(10) Patent No.: US 11,497,071 B2
(45) Date of Patent: Nov. 8, 2022

(54) ASSOCIATION HANDLING METHOD AND DEVICE

(71) Applicants: China Mobile Communication Co., Ltd Research Institute, Beijing (CN); China Mobile Communications Group Co., Ltd., Beijing (CN)

(72) Inventors: Liang Liu, Beijing (CN); Gang Li, Beijing (CN); Guang Yang, Beijing (CN); Yang Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 187 days.

(21) Appl. No.: 16/757,594

(22) PCT Filed: Sep. 25, 2018

(86) PCT No.: PCT/CN2018/107213
§ 371 (c)(1),
(2) Date: Apr. 20, 2020

(87) PCT Pub. No.: WO2019/076182
PCT Pub. Date: Apr. 25, 2019

(65) Prior Publication Data
US 2021/0204341 A1 Jul. 1, 2021

(30) Foreign Application Priority Data

Oct. 19, 2017 (CN) .......................... 201710980574.3

(51) Int. Cl.
*H04W 24/00* (2009.01)
*H04W 76/15* (2018.01)
*H04W 24/02* (2009.01)
*H04L 61/50* (2022.01)

(52) U.S. Cl.
CPC ............. *H04W 76/15* (2018.02); *H04L 61/50* (2022.05); *H04W 24/02* (2013.01)

(58) Field of Classification Search
CPC ...... H04L 61/20; H04W 24/02; H04W 76/10; H04W 76/15
See application file for complete search history.

(56) References Cited

U.S. PATENT DOCUMENTS

2012/0207049 A1 8/2012 Du et al.
2014/0173023 A1 6/2014 Varney et al.
(Continued)

FOREIGN PATENT DOCUMENTS

CN 101242348 A 8/2008
CN 102404378 B 4/2012
(Continued)

OTHER PUBLICATIONS

Chinese Office Action (First) dated May 7, 2020, for Chinese Patent Application No. 201710980574.3, 11 pages.
(Continued)

*Primary Examiner* — Abdelillah Elmejjarmi
(74) *Attorney, Agent, or Firm* — Morgan, Lewis & Bockius LLP

(57) ABSTRACT

An association handling method and device are provided. The method includes: determining one or more TNL addresses of a CU; and establishing multiple TNL associations between a DU and the CU according to the one or more TNL addresses.

16 Claims, 13 Drawing Sheets

(56) References Cited

U.S. PATENT DOCUMENTS

| | | | |
|---|---|---|---|
| 2017/0150544 A1 | 5/2017 | Xu et al. | |
| 2017/0215225 A1 | 7/2017 | Yi et al. | |
| 2019/0223251 A1 | 7/2019 | Jiang et al. | |
| 2020/0022195 A1* | 1/2020 | Wang | H04W 36/06 |

FOREIGN PATENT DOCUMENTS

| | | |
|---|---|---|
| CN | 102857376 A | 1/2013 |
| CN | 103404227 B | 11/2013 |
| CN | 103813478 A | 5/2014 |
| CN | 105247931 B | 1/2016 |
| CN | 105264956 A | 1/2016 |
| CN | 105594180 A | 5/2016 |
| CN | 106162730 A | 11/2016 |
| CN | 106537882 A | 3/2017 |
| CN | 106538037 A | 3/2017 |
| CN | 106550490 A | 3/2017 |
| CN | 107113862 A | 8/2017 |
| EP | 2276316 A1 | 1/2011 |

OTHER PUBLICATIONS

English Translation of Chinese Office Action (First) dated May 7, 2020, for Chinese Patent Application No. 201710980574.3, 15 pages.
R3-173656, 3GPP TSG RAN WG3 NR#97bis, Prague, Czech, Oct. 9-13, 2017, Agenda item 10.10.1.2, 3 pages.
R3-173959, 3GPP TSG RAN WG3 NR#97b, Prague, Czech, Oct. 9-13, 2017, Agenda item 10.10.1.1, 8 pages.
Chinese Written Opinion of the International Searching Authority dated Jan. 4, 2019 for PCT/CN2018/107213, 10 pages.
International Preliminary Report on Patentability with Written Opinion (in English) dated Jan. 4, 2019 for PCT/CN2018/107213, 7 pages.
CN 106162730 A, Nov. 23, 2016, Huawei Tech Co Ltd—English Translation of A4.
CN 106550490 A, Mar. 29, 2017, Beijing Xiaomi Mobile Software Co Ltd—English Translation of A7.
R3-173042; 3GPP TSG RAN WG3 Meeting#97; Berlin, Germany; Aug. 21-25, 2017; Agenda Item 10.5.1; 4 pages.
R3-173139; 3GPP TSG RAN WG3 #97; Berlin, Germany; Aug. 21-25, 2017; Agenda Item 10.10.1.1; 3 pages.
R3-173635; 3GPP TSG RAN WG3 Meeting#97bis; Prague, Czech Republic; Oct. 9-13, 2017; Agenda Item 10.10.1.1; 3 pages.
R3-173960; 3GPP TSG RAN WG3 Meeting#97b; Prague, Czech Republic; Oct. 9-13, 2017; Agenda Item 10.10.1.1; 3 pages.
Chinese Office Action dated Aug. 31, 2021, for Chinese Patent Application No. 201710980574.3, 2 pages.
Supplementary Partial European Search Report corresponding to International Patent Application No. PCT/CN18/107213, dated Jul. 19, 2021, 17 pages.

* cited by examiner

Receiving a signaling transmitted by a CU and used to notify that the CU updates or releases a binding relationship between the F1 AP signaling and a TNL — 1001

ASSOCIATION HANDLING METHOD AND DEVICE

CROSS-REFERENCE TO RELATED APPLICATION

The present application is a U.S. national phase application of a PCT Application No. PCT/CN2018/107213 filed on Sep. 25, 2018, which claims a priority to Chinese Patent Application No. 201710980574.3 filed in China on Oct. 19, 2017, a disclosure of which is incorporated in its entirety by reference herein.

TECHNICAL FIELD

The present disclosure relate to the field of communication technology, in particular to an association handling method and a device in a central unit (CU)-distributed unit (DU) architecture.

BACKGROUND

Access network logic nodes in a third-generation mobile communication (3G) system includes a nodeB (NB) and a radio network controller (RNC). A fourth-generation mobile communication (4G) logic architecture has a flatter design and only includes an evolved Node B (eNB). The research project on fifth-generation mobile communication (5G) scenarios and requirements was launched at the 3rd Generation Partnership Project (3GPP) radio access network (RAN) plenary meeting in December, 2015. The research report on 5G scenario and requirements approved at the RAN plenary meeting #71 specifies requirements on a 5G access network architecture. A most typical requirement different from those in a 4G access network is that an access network supports logic functional division of distributed remote unit (DU) and CU and supports migration of a protocol stack function between a CU and a DU.

Compared with a flat 4G architecture, the benefits of a two-level CU-DU architecture of an access network are as follows: an inter-cell cooperation gain can be obtained and a centralized load management is implemented; centralized control, such as multiple associations and dense handover, in ultra-dense network is efficiently implemented; a pooling gain is obtained, and network function virtualization (NFV) or software defined network (SDN) is enabled to satisfy deployment requirements of a carrier in some 5G scenarios.

As a central node, a CU can control and coordinate among multiple cells. The CU includes higher-layer protocol stack control and data functions and may include some baseband processing functions as well. A DU is a distributed unit and implements a remote radio head (RRH) function and the remaining baseband processing functions. The CU and the DU are connected by a fronthaul interface. There are multiple split solutions for CU-DU functional division. Different split solutions have different applicable scenarios and performance gains, and also have significantly different requirements of parameters of the fronthaul interface, such as bandwidth, transmission latency, and synchronization. According to a 3GPP RAN3 conclusion, a packet data convergence protocol (PDCP)-radio link control (RLC) protocol split solution is to be standardized, and a CU-DU interface is defined as an F1 interface, as shown in FIG. 1. A conventional interface definition method is used for a F1 interface protocol stack, and the protocol stack may be divided into a transport network layer (TNL) and a radio network layer (RNL). F1-C uses a stream control transmission protocol (SCTP) to ensure signaling reliability. F1-U uses a general packet radio service (GPRS) tunneling protocol for the user plane (GTP-U) to ensure data transmission, and only one TNL association is established for the F1 interface between a CU-DU pair, as shown in FIG. 2a and FIG. 2b.

A conclusion in the related art is to establish one TNL association between a CU and a DU. Future 5G CU-DU architecture faces several problems in the deployment and actual usage as follows.

1) In the future, CUs are deployed in a centralized manner, for example, are located in a core convergence room, and the CUs use a cloud platform and virtualization architecture. Functions of a CU are presented in the form of virtual machines in an edge data center. The capacity is scaled according to an actual resource demand. For example, instantiation is performed, that is, new CU instances are generated on a cloud platform according to an increase in user quantity and an increase of services, a part of load is migrated from one CU to another CU, or with a reduction in user quantity and a reduction of services, some CU instances are released. Referring to FIG. 3, these CU instances may have different Internet Protocol (IP) addresses. In addition, from the perspective of ensuring reliability, centralized CUs may lead to a higher risk of network breakdown. If a single TNL association is established between a CU and a DU, when the CU or a transport network encounters a fault, network reachability is impacted in a relatively large area. Therefore, one TNL association established between a CU and a DU cannot satisfy actual deployment requirements.

2) A 5G CU-DU architecture needs to satisfy multiple service requirements at the same time. These service requirements have different requirements on end-to-end latency. For example, enhanced mobile broadband (eMBB) has a relatively high requirement on air interface throughput, but has a relatively low requirement on latency. However, a low-latency high-reliability service has a very high requirement on latency. Therefore, referring to FIG. 4, different services of the same user equipment (UE) or different UEs may need to have access to CUs deployed at different locations. One TNL association between a CU and a DU cannot satisfy this requirement.

SUMMARY

In view of the foregoing technical problem, the present disclosure provides in some embodiments an association handling method and device, to resolve the problem that one TNL association between a CU and a DU cannot satisfy actual deployment requirements.

According to a first aspect, an association handling method applied to a DU is provided, including:

determining one or more TNL addresses of a CU; and establishing multiple TNL associations between the DU and the CU according to the one or more TNL addresses.

Optionally, the establishing the multiple TNL associations between the DU and the CU according to the one TNL address includes:

establishing a first TNL association according to the one TNL address;

receiving a second TNL address according to the first TNL association; and establishing a second TNL association according to the second TNL address.

Optionally, the receiving the second TNL address according to the first TNL association includes:

receiving an F1 setup response message according to the first TNL association, where the F1 setup response message includes the second TNL address; or receiving a CU configuration update message according to the first TNL association, where the CU configuration update message includes the second TNL address.

Optionally, the method further includes:

receiving an update request message for updating a TNL association of the DU; and updating the TNL association of the DU according to the update request message.

Optionally, the receiving the update request message for updating the TNL association of the DU includes:

receiving an F1 setup response message, where the F1 setup response message includes the update request message instructing an update of the TNL association of the DU; or receiving a CU configuration update message, where the CU configuration update message includes the update request message instructing an update of the TNL association of the DU.

According to a second aspect, an association handling method applied to a CU is further provided, including:

establishing multiple TNL associations between the CU and a DU according to one or more TNL addresses.

Optionally, the establishing the multiple TNL associations between the CU and the DU according to the one or more TNL addresses includes:

establishing a first TNL association with the DU according to the one TNL address;

transmitting a second TNL address to the DU according to the first TNL association; and establishing a second TNL association with the DU according to the second TNL address.

Optionally, the transmitting the second TNL address to the DU according to the first TNL association includes:

transmitting an F1 setup response message to the DU according to the first TNL association, where the F1 setup response message includes the second TNL address; or transmitting a CU configuration update message to the DU according to the first TNL association, where the CU configuration update message includes the second TNL address.

Optionally, the method further includes:

transmitting an update request message for updating a TNL association of the DU to the DU.

Optionally, the transmitting the update request message for updating the TNL association of the DU to the DU includes:

transmitting an F1 setup response message to the DU, where the F1 setup response message includes the update request message instructing an update of the TNL association of the DU; or transmitting a CU configuration update message to the DU, where the CU configuration update message includes the update request message instructing an update of the TNL association of the DU.

According to a third aspect, an association handling method applied to a DU is further provided, including:

receiving a signaling transmitted by a CU and used to notify that the CU updates or releases a binding relationship between an F1 application layer (AP) signaling and a TNL.

Optionally, the receiving the signaling transmitted by the CU and used to notify that the CU updates the binding relationship between the F1 AP signaling and the TNL includes:

receiving a first signaling transmitted by the CU, where the first signaling includes an identifier of updating the binding relationship between the F1 AP signaling and the TNL.

Optionally, the receiving the signaling transmitted by the CU and used to notify that the CU updates the binding relationship between the F1 AP signaling and the TNL includes:

receiving a second signaling transmitted by the CU and dedicated to updating the binding relationship between the F1 AP signaling and the TNL.

Optionally, the receiving the signaling transmitted by the CU and used to notify that the CU updates the binding relationship between the F1 AP signaling and the TNL includes:

transmitting a third signaling to the CU by using a third TNL association; and receiving a fourth signaling transmitted by the CU in response to the third signaling by using a fourth TNL association.

Optionally, the receiving the signaling transmitted by the CU and used to notify that the CU releases the binding relationship between the F1 AP signaling and the TNL includes:

receiving a fifth signaling, where the fifth signaling includes a message for releasing the binding relationship between F1 AP signaling and a fifth TNL association.

Optionally, if a UE-unrelated signaling is used to notify the DU, it is indicated that an F1 AP signaling bound with the fifth TNL association is to be released; or if a UE-related signaling is used to notify the DU, it is indicated that an F1 AP signaling bound with the fifth TNL association that is related to the UE is to be released.

Optionally, the receiving the signaling transmitted by the CU and used to notify that the CU releases the binding relationship between the F1 AP signaling and the TNL includes:

receiving a sixth signaling, where a sixth TNL association field in the sixth signaling is set to null, and the sixth TNL association field being set to null indicates that the CU releases an F1 AP signaling bound with the sixth TNL association.

According to a fourth aspect, An association handling method applied to a CU in a TNL association with a DU is further provided, including:

notifying a DU that the CU updates or releases a binding relationship between the F1 AP signaling and the TNL.

Optionally, the notifying the DU that the CU updates the binding relationship between the F1 AP signaling and the TNL includes:

transmitting a first signaling to the DU, where the first signaling includes an identifier of updating the binding relationship between the F1 AP signaling and the TNL; or transmitting a second signaling dedicated to updating the binding relationship between the F1 AP signaling and the TNL to the DU.

Optionally, the notifying the DU that the CU updates the binding relationship between the F1 AP signaling and the TNL includes:

receiving a third signaling transmitted by the DU by using a third TNL association; and transmitting a fourth signaling in response to the third signaling to the DU by using a fourth TNL association, where the fourth signaling is used for instructing the DU to update the binding relationship between the F1 AP signaling and the TNL according to the fourth signaling.

Optionally, the notifying the DU that the CU releases the binding relationship between the F1 AP signaling and the TNL includes:

notifying, by using a signaling, the DU that the CU releases the binding relationship between the F1 AP signaling and the TNL.

Optionally, the notifying the DU that the CU releases the binding relationship between the F1 AP signaling and the TNL includes:

transmitting a sixth signaling to the DU, where a TNL association field in the sixth signaling is set to null, and a sixth TNL association being set to null indicates that the CU releases an F1 AP signaling bound with the sixth TNL association.

According to a fifth aspect, a DU including a first processor and a first transceiver is further provided, where the first processor is configured to: determine one or more TNL addresses of a CU; and establish multiple TNL associations between the DU and the CU according to the one or more TNL addresses.

According to a sixth aspect, a DU including a second processor and a second transceiver is further provided, where the second transceiver is configured to receive a signaling transmitted by a CU and used to notify that the CU updates or releases a binding relationship between the F1 AP signaling and the TNL.

According to a seventh aspect, a CU including a third processor and a third transceiver is further provided, where the third transceiver is configured to notify a DU that the CU updates or releases a binding relationship between the F1 AP signaling and the TNL.

According to an eighth aspect, a CU including a fourth processor and a fourth transceiver is further provided, where the fourth processor is configured to establish multiple TNL associations between the CU and a DU according to one or more TNL addresses.

According to a ninth aspect, a DU is further provided, including: a processor, a storage, and a computer program stored in the storage and configured to be executed by the processor, where the processor is configured to execute the computer program to implement the steps in the association handling method according to the first aspect or implement the steps in the association handling method according to the third aspect.

According to a tenth aspect, a CU is further provided, including: a processor, a storage, and a computer program stored in the storage and configured to be executed by the processor, where the processor is configured to execute the computer program to implement the steps in the association handling method according to the second aspect or implement the steps in the association handling method according to the fourth aspect.

According to an eleventh aspect, a computer-readable storage medium is further provided, the computer-readable storage medium storing therein a computer program, where the computer program is configured to be executed by a processor to implement the steps in the association handling method according to the first aspect or the second aspect or the third aspect or the fourth aspect.

Therefore, in the embodiments of the present disclosure, multiple TNL associations are established between a CU and a DU to satisfy a future deployment requirement of 5G CUs in a cloud platform virtualization environment, and a user may select CU devices with different TNL addresses according to service requirements.

DETAILED DESCRIPTION

To make the objectives, technical solutions, and advantages of the present disclosure more clearly, the technical solutions in the embodiments of the present disclosure are described clearly and completely with reference to the accompanying drawings in the embodiments of the present disclosure. Apparently, the described embodiments are some embodiments of the present disclosure, but are not all the embodiments. Based on the described embodiments of the present disclosure, all other embodiments derived by a person of ordinary skill in the art without creative efforts shall fall within the scope of the present disclosure.

Figure 1:
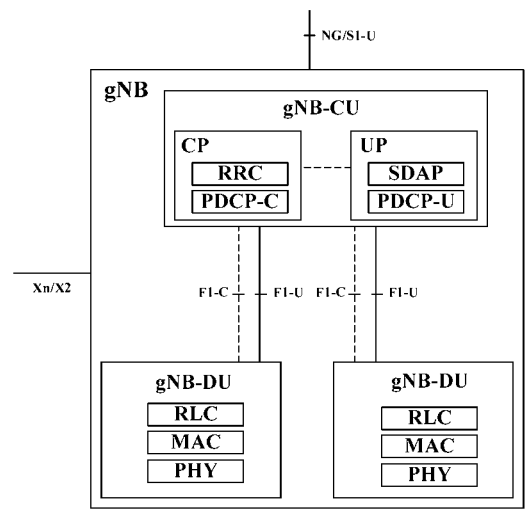
FIG. 1 is a schematic diagram of a CU-DU architecture and interfaces.
Figure 2A:
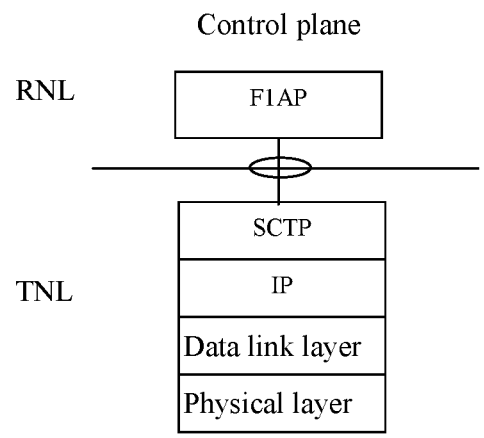
FIG. 2a and FIG. 2b are schematic diagrams of an F1 interface protocol stack.
Figure 2B:
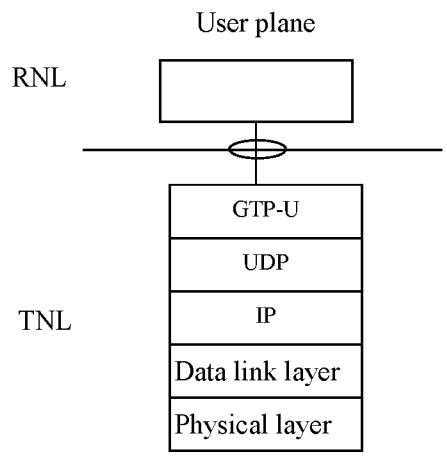
Figure 3:
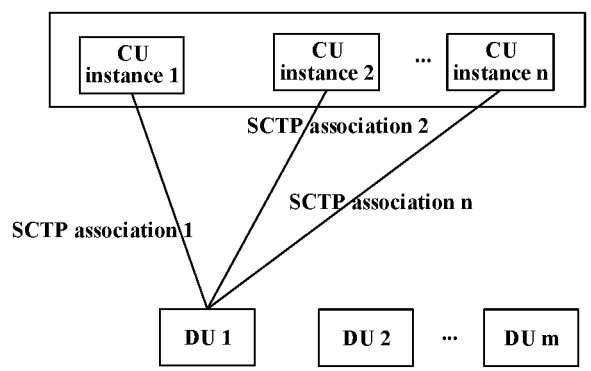
FIG. 3 is a schematic diagram of a centralized deployment of CUs.
Figure 4:
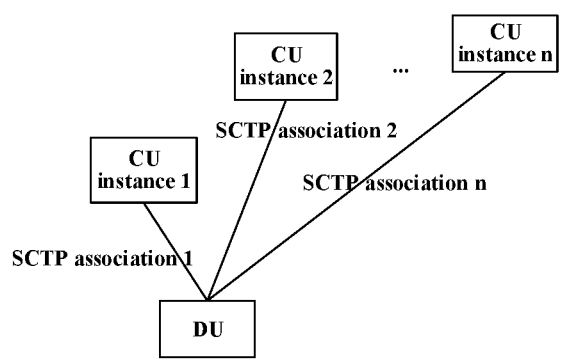
FIG. 4 is a schematic diagram of a distributed deployment of CUs.
Figure 5:
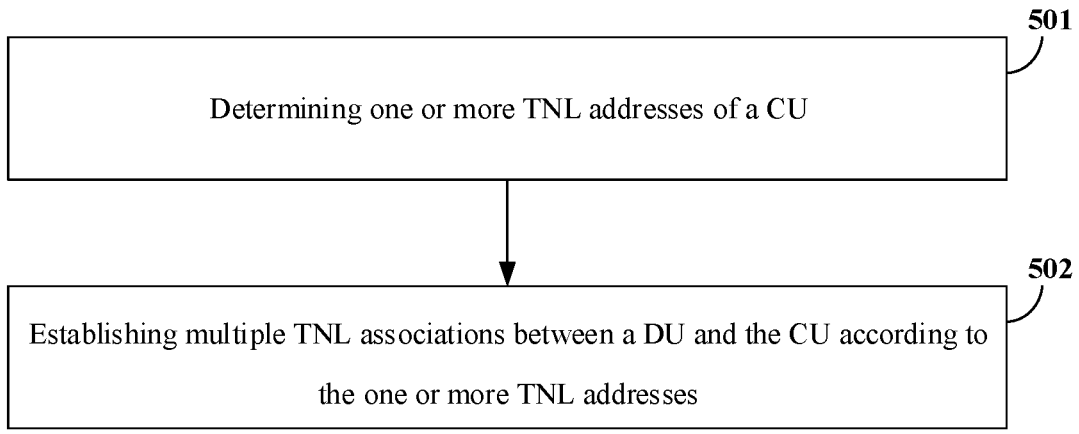
FIG. 5 is a first flowchart of an association handling method according to some embodiments of the present disclosure.

FIG. 5 shows a procedure of an association handling method according to an embodiment. The method is performed by a DU and includes specific steps as follows.

A step 501 includes: determining one or more TNL addresses of a CU.

The CU may be a CU logic unit, and the CU logic unit may include multiple CU entities.

For example, one or more TNL addresses of the CU that are configured by an operation, administration and maintenance (OAM) entity are determined.

A step 502 includes: establishing multiple TNL associations between the DU and the CU according to the one or more TNL addresses.

Therefore, multiple TNL associations are established between a CU and a DU to satisfy a future deployment requirement of 5G CUs in a cloud platform virtualization environment, and a user may select CU devices with different TNL addresses according to service requirements.

Figure 6:
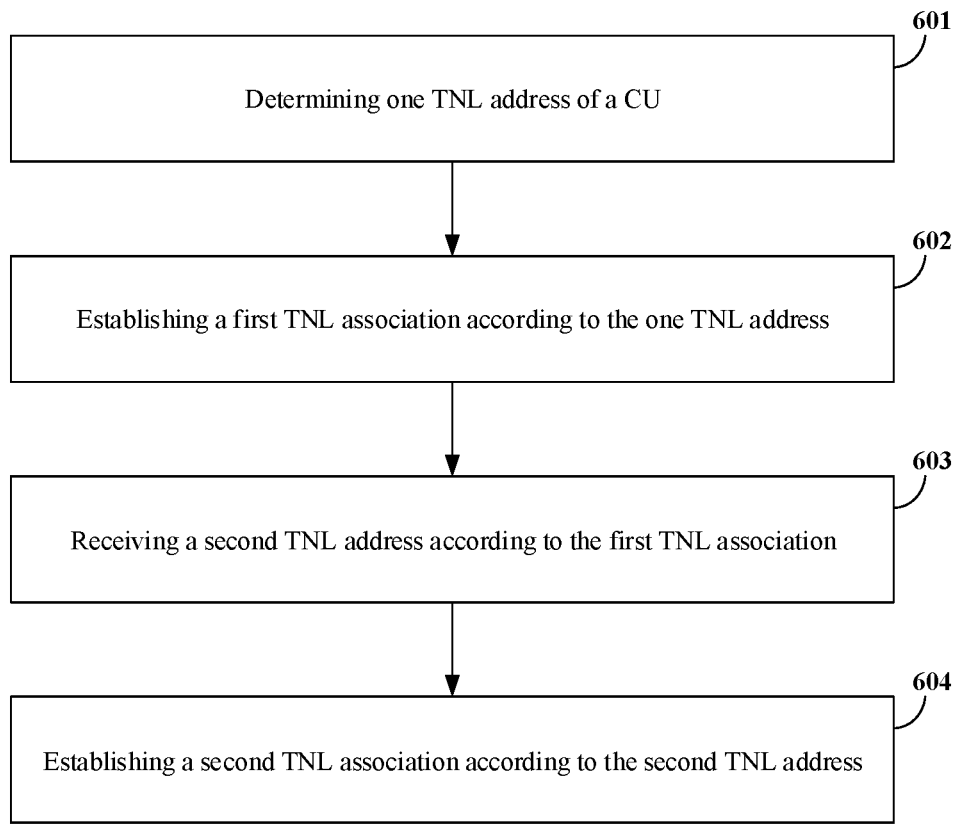
FIG. 6 is a second flowchart of an association handling method according to some embodiments of the present disclosure.

FIG. 6 shows a procedure of an association handling method according to another embodiment. The method is performed by a DU and includes specific steps as follows.

A step 601 includes: determining one TNL address of a CU.

The CU may be one CU instance (or referred to as a CU entity).

For example, one TNL address of the CU configured by OAM is determined.

A step 602 includes: establishing a first TNL association of the DU according to the one TNL address.

A step 603 includes: receiving a second TNL address according to the first TNL association.

The second TNL address may include TNL addresses of a second CU instance and a third CU instance.

For example, an F1 setup response message is received, where the F1 setup response message includes the second TNL address; or, a CU configuration update message is received, where the CU configuration update message includes the second TNL address.

A step 604 includes: establishing a second TNL association according to the second TNL address.

For example, if the second TNL address includes TNL addresses of a second CU instance and a third CU instance, TNL associations are established with the second CU instance and the third CU instance according to the second TNL address.

Therefore, multiple TNL associations are established between a CU and a DU to satisfy a future deployment requirement of 5G CUs in a cloud platform virtualization environment, and a user may select CU devices with different TNL addresses according to service requirements.

Figure 7:
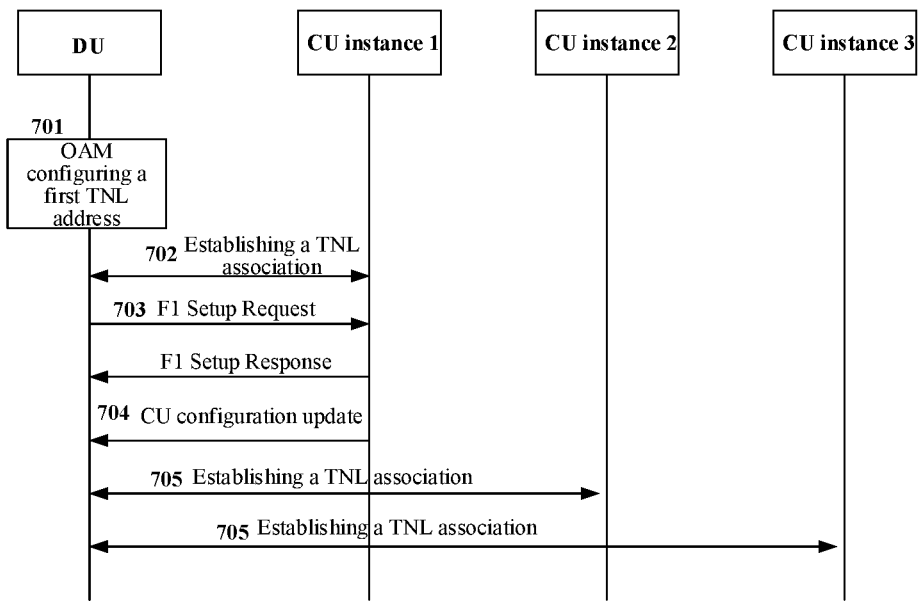
FIG. 7 is a first flowchart of establishing and managing a TNL association according to some embodiments of the present disclosure.

FIG. 7 shows a procedure of establishing and managing a TNL association according to still another embodiment and the procedure includes specific steps as follows.

A step 701 includes: configuring, by OAM, a TNL address of a CU instance 1 for a DU.

A step 702 includes: establishing, by the DU, a TNL association with the CU instance 1.

A step 703 includes: initiating, by the DU, an F1 Setup Request message on the TNL association.

A step 704 includes: transmitting, by the CU instance 1, a TNL association list to the DU, where the TNL association list includes TNL addresses of a CU instance 2 and a CU instance 3.

For example, an F1 setup response message or a CU configuration update message may be used to transmit the TNL association list to the DU.

A step 705 includes: establishing, by the DU, TNL associations with the CU instance 2 and the CU instance 3.

Therefore, multiple TNL associations are established between a CU and a DU to satisfy a future deployment requirement of 5G CUs in a cloud platform virtualization environment, and a user may select CU devices with different TNL addresses according to service requirements.

Figure 8:
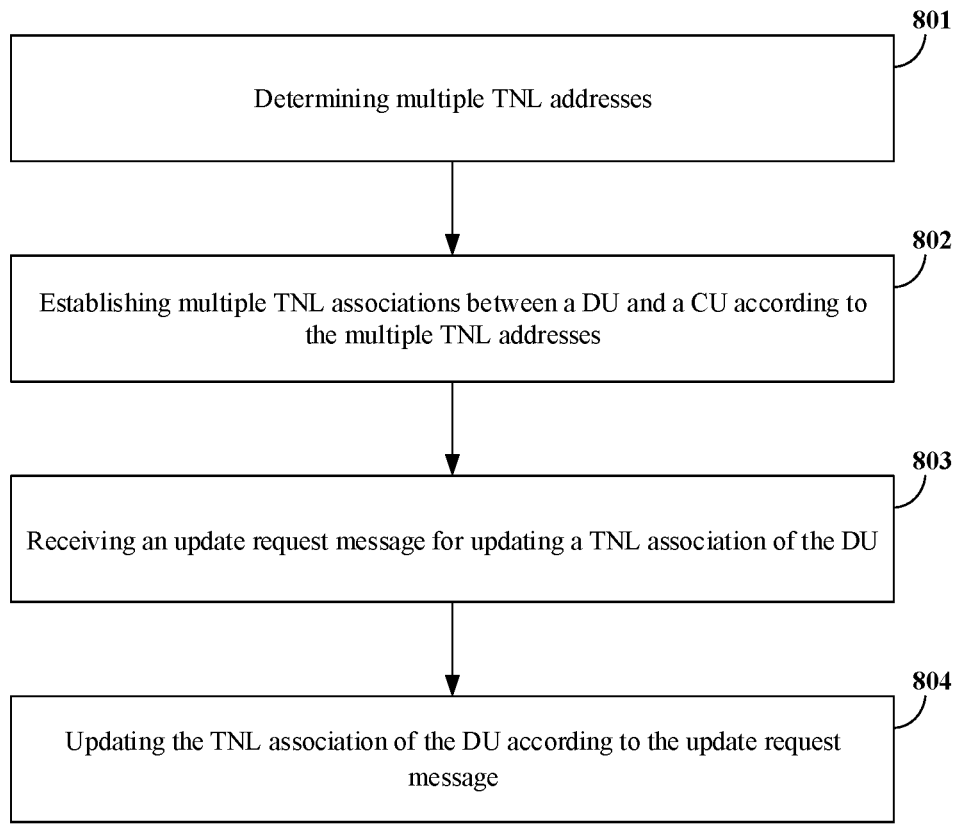
FIG. 8 is a third flowchart of an association handling method according to some embodiments of the present disclosure.

FIG. 8 shows a procedure of an association handling method according to still another embodiment. The method is performed by a DU and includes specific steps as follows.

A step 801 includes: determining multiple TNL addresses of a CU.

The CU may be one logic CU, and the logic CU includes multiple CU instances, and each CU instance corresponds to one TNL address.

For example, multiple TNL addresses of the CU that are configured by OAM are determined.

A step 802 includes: establishing multiple TNL associations between the DU and the CU according to the multiple TNL addresses.

A step 803 includes: receiving an update request message for updating a TNL association of the DU.

For example, an F1 setup response message is received, where the F1 setup response message includes the update request message instructing an update of the TNL association of the DU; or a CU configuration update message is received, where the CU configuration update message includes the update request message instructing an update of the TNL association of the DU.

A step 804 includes: updating the TNL association of the DU according to the update request message.

Therefore, multiple TNL associations are established between a CU and a DU to satisfy a future deployment requirement of 5G CUs in a cloud platform virtualization environment, and a user may select CU devices with different TNL addresses according to service requirements.

Figures 9, 10:
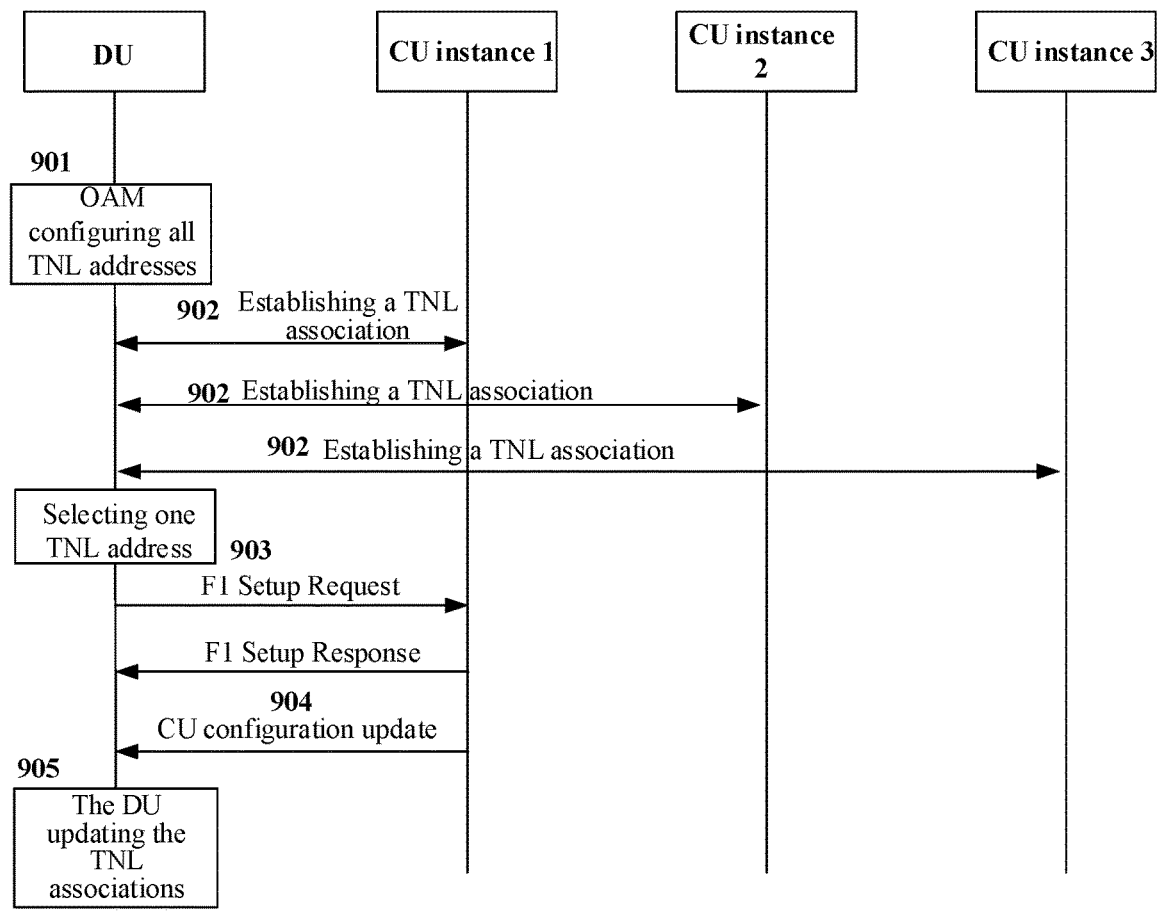
FIG. 9 is a second flowchart of establishing and managing a TNL association according to some embodiments of the present disclosure.
FIG. 10 is a fourth flowchart of an association handling method according to some embodiments of the present disclosure.

FIG. 9 shows a procedure of establishing and managing a TNL association according to another embodiment and the procedure includes specific steps as follows.

A step 901 includes: configuring, by OAM, TNL addresses of a CU instance 1, a CU instance 2, and a CU instance 3 for a DU.

A step 902 includes: establishing, by the DU, TNL associations with the CU instance 1, the CU instance 2, and the CU instance 3.

It needs to be noted that if a CU finds that some TNL associations are no longer supported, the TNL association setup may be directly rejected at a SCTP layer.

A step 903 includes: selecting, by the DU, the TNL association with the CU instance 1 from the established TNL associations to initiate an F1 setup request message.

A step 904 includes: notifying, by the CU instance 1, the DU to update a TNL association list.

For example, some TNL associations are added or deleted. Further, an F1 setup response message or a CU configuration update message may be used to notify the DU to update the TNL association list.

A step 905 includes: updating, by the DU, the TNL associations.

Therefore, multiple TNL associations are established between a CU and a DU to satisfy a future deployment requirement of 5G CUs in a cloud platform virtualization environment, and a user may select CU devices with different TNL addresses according to service requirements.

FIG. 10 shows a procedure of an association handling method according to still another embodiment. The method is performed by a DU and includes specific steps as follows.

A step 1001 includes: receiving a signaling transmitted by a CU and used to notify that the CU updates or releases a binding relationship between the F1 AP signaling and the TNL It needs to be noted that, the F1 AP signaling is a signaling transferred between the CU and the DU via the F1 AP. The F1 AP signaling includes: a UE-related signaling and a UE-unrelated signaling. The CU may make change or update as to on which TNL a F1 AP signaling is transmitted, and the UE-related signaling and the UE-unrelated signaling may be transmitted by using different TNL associations.

Therefore, in the embodiment of the present disclosure, the DU can learn that the CU changes or updates the binding relationship between an F1 AP and a TNL.

Figure 11:
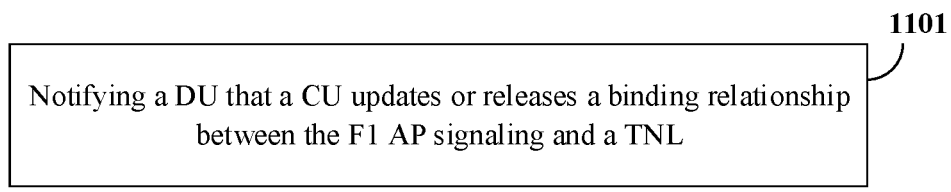
FIG. 11 is a fifth flowchart of an association handling method according to some embodiments of the present disclosure.

FIG. 11 shows a procedure of an association handling method according to still another embodiment. The method is performed by a CU in a TNL association with a DU and includes specific steps as follows.

A step 1101 includes: notifying a DU that the CU updates or releases a binding relationship between the F1 AP signaling and the TNL.

It needs to be noted that, the F1 AP signaling is a signaling transferred between the CU and the DU via the F1 AP. The F1 AP signaling includes: UE-related signaling and UE-unrelated signaling. The CU may make change or update as to on which TNL a F1 AP signaling is transmitted, and the UE-related signaling and the UE-unrelated signaling may be transmitted by using different TNL associations.

Figure 12:
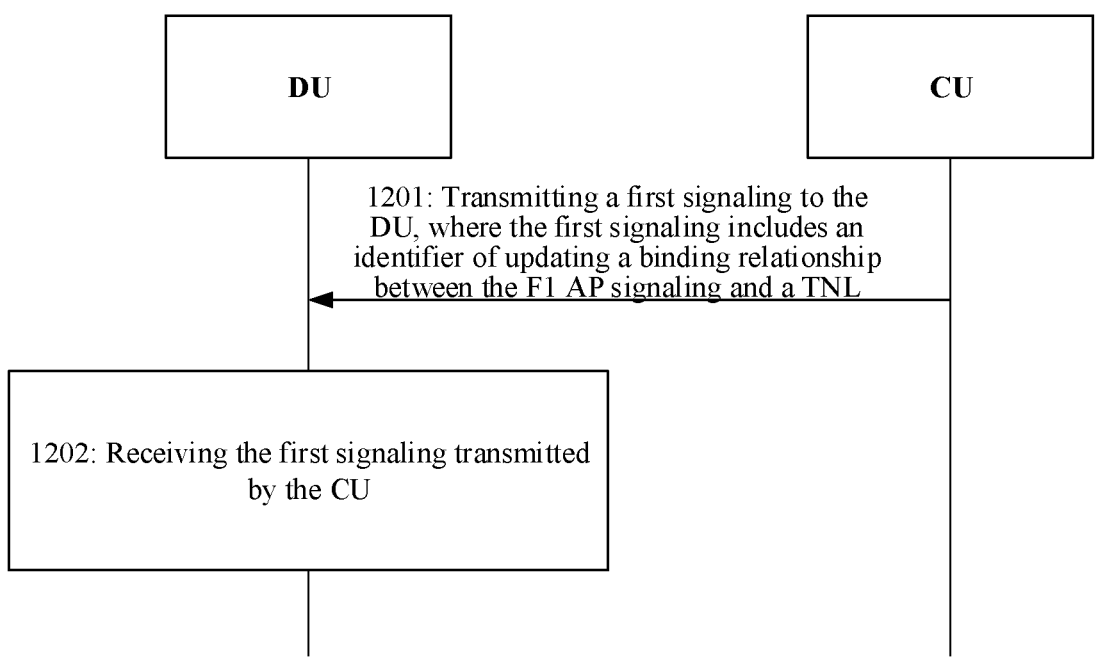
FIG. 12 is a sixth flowchart of an association handling method according to some embodiments of the present disclosure.

FIG. 12 shows a procedure of an association handling method according to still another embodiment and the procedure includes specific steps as follows.

A step 1201 includes: transmitting, by a CU, a first signaling to a DU, where the first signaling includes an identifier of updating or changing a binding relationship between F1 AP signaling and a TNL.

Optionally, the first signaling may be F1 AP signaling in the related art. That is, the identifier of updating the binding relationship between the F1 AP signaling and the TNL is added to the F1 AP signaling in the related art.

A step 1202 includes: receiving, by the DU, the first signaling transmitted by the CU.

That is, the DU can learn from the first signaling that the CU has updated the binding relationship between F1 AP signaling and a TNL.

It needs to be noted that, a manner of updating the binding relationship between F1 AP signaling and a TNL in the embodiment of the present disclosure may apply to all F1 AP signaling, or may apply to only a UE-unrelated signaling or only a UE-related signaling.

Figure 13:
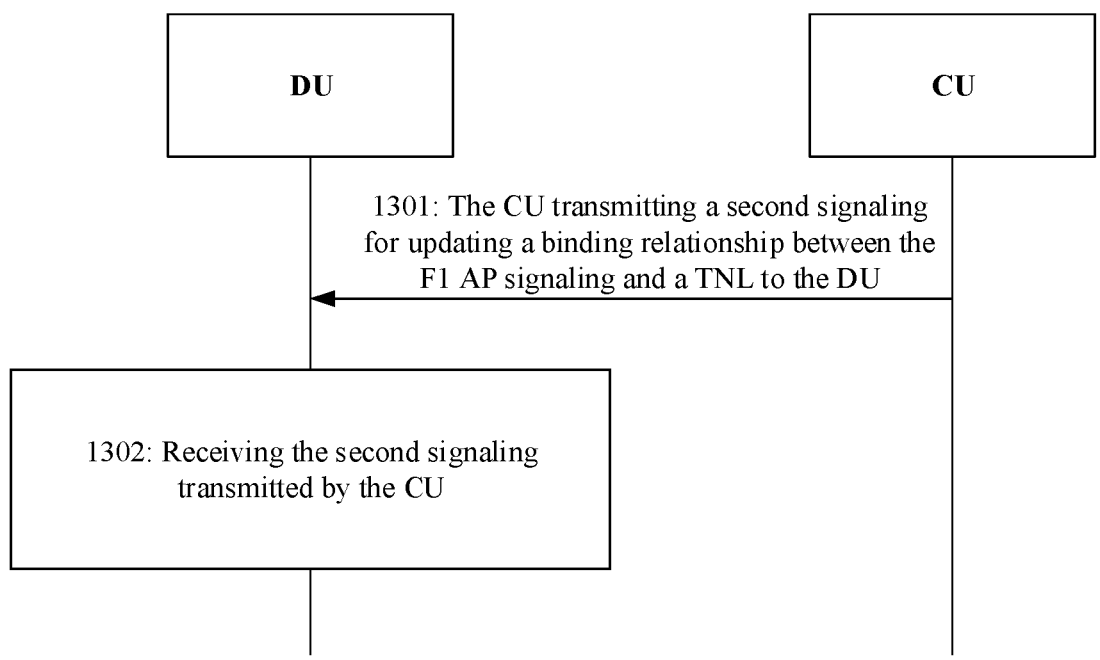
FIG. 13 is a seventh flowchart of an association handling method according to some embodiments of the present disclosure.

FIG. 13 shows a procedure of an association handling method according to still another embodiment and the procedure includes specific steps as follows.

A step 1301 includes: transmitting, by a CU, a second signaling dedicated to updating a binding relationship between F1 AP signaling and a TNL to a DU.

Optionally, the second signaling is a signaling dedicated to updating the binding relationship between an F1 AP and a TNL, for example, an AP-TNL binding update signaling.

A step 1302 includes: receiving the second signaling transmitted by the CU.

That is, the DU can learn from the second signaling that the CU has updated the binding relationship between F1 AP signaling and a TNL.

It needs to be noted that, a manner of updating the binding relationship between F1 AP signaling and a TNL in the embodiment of the present disclosure may apply to all F1 AP signalings, or may apply to only a UE-unrelated signaling or only a UE-related signaling.

Figure 14:
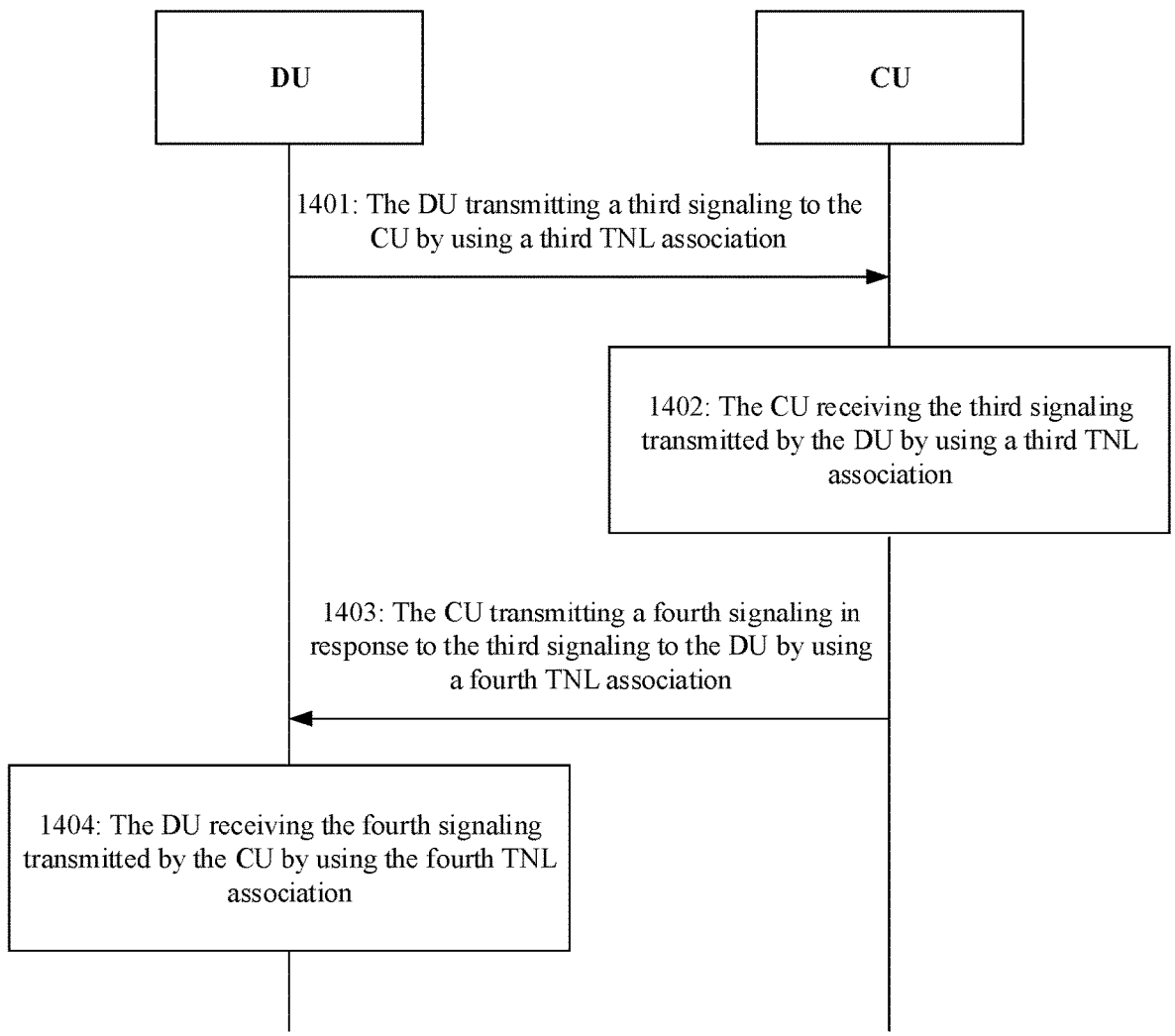
FIG. 14 is an eighth flowchart of an association handling method according to some embodiments of the present disclosure.

FIG. 14 shows a procedure of an association handling method according to still another embodiment and the procedure includes specific steps as follows.

A step 1401 includes: transmitting, by a DU, a third signaling to a CU by using a third TNL association.

A step 1402 includes: receiving, by the CU, the third signaling transmitted by the DU by using a third TNL association and used to request to update a binding relationship between an F1 AP signaling and a TNL.

A step 1403 includes: transmitting, by the CU, a fourth signaling in response to the third signaling to the DU by using a fourth TNL association.

A step 1404 includes: receiving, by the DU, the fourth signaling transmitted by the CU by using the fourth TNL association.

Therefore, the DU can learn that the CU has updated the binding relationship between the F1 AP signaling and a TNL into a binding relationship between the F1 AP signaling and the fourth TNL association.

In the embodiment of the present disclosure, the DU first transmits a request signaling on a TNL1. The CU determines to change or update the binding relationship between the F1 AP signaling and a TNL. The CU transmits a feedback signaling on a TNL2. When receiving the feedback signaling on the TNL2, the DU learns that the CU has updated the binding relationship between the F1 AP signaling and a TNL.

It needs to be noted that, a manner of updating the binding relationship between the F1 AP signaling and a TNL in the embodiment of the present disclosure is applicable to a class 1 F1 AP signaling and REQ and RES messages.

Figure 15:
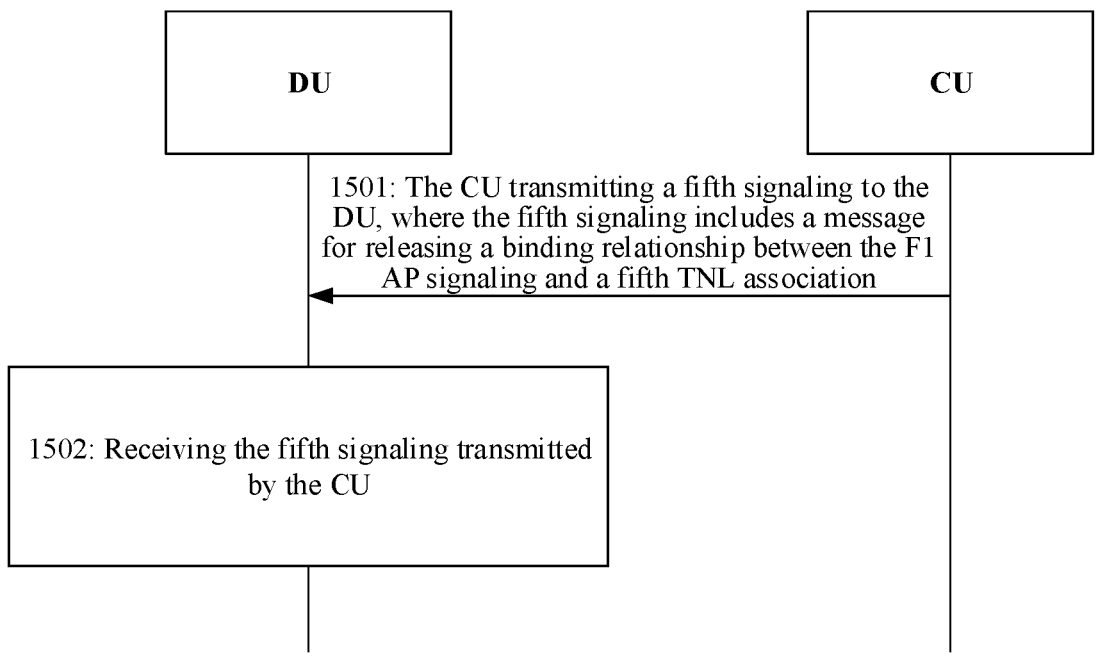
FIG. 15 is a ninth flowchart of an association handling method according to some embodiments of the present disclosure.

FIG. 15 shows a procedure of an association handling method according to still another embodiment and the procedure includes specific steps as follows.

A step 1501 includes: transmitting, by a CU, message for releasing a binding relationship between the F1 AP signaling and a TNL to a DU by using a fifth signaling.

A step 1502 includes: receiving, by the DU, the fifth signaling transmitted by the CU.

If a UE-unrelated signaling, for example, the CU configuration update signaling, is used to notify the DU, a signaling (for example, all signalings) bound with a fifth TNL association is released. If a UE-related signaling is used to notify the DU, for example, indication is added to an existing UE context related signaling or using a new release dedicated signaling is used, the binding relationship of UE with the fifth TNL association is released.

Figure 16:
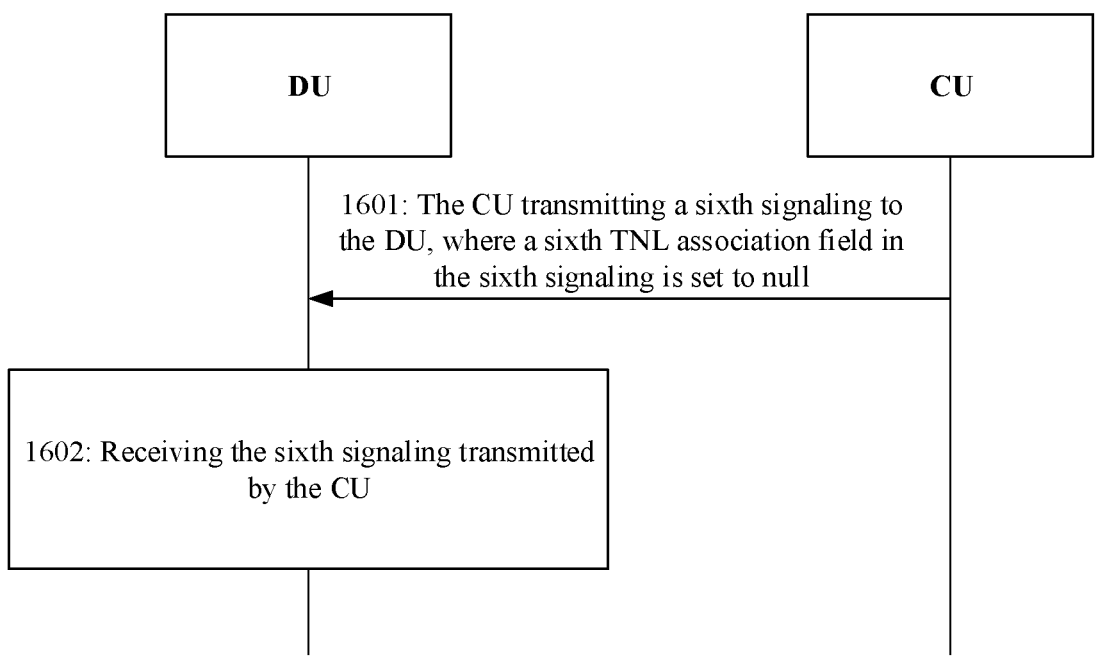
FIG. 16 is a tenth flowchart of an association handling method according to some embodiments of the present disclosure.

FIG. 16 shows a procedure of an association handling method according to still another embodiment and the procedure includes specific steps as follows.

A step 1601 includes: transmitting, by a CU, a sixth signaling to a DU, where a sixth TNL association field in the sixth signaling is set to null.

The sixth TNL association field being set to null indicates that the CU releases an F1 AP signaling bound with the sixth TNL association.

A step 1602 includes: receiving the sixth signaling transmitted by the CU.

The present disclosure further provides in some embodiments a DU. Because the principle of resolving the problem by the DU is similar to that of the association handling method in the embodiments of the present disclosure, for the implementation of the DU, reference may be made to the implementation of the method. Details are not described herein again in the embodiment.

Figure 17:
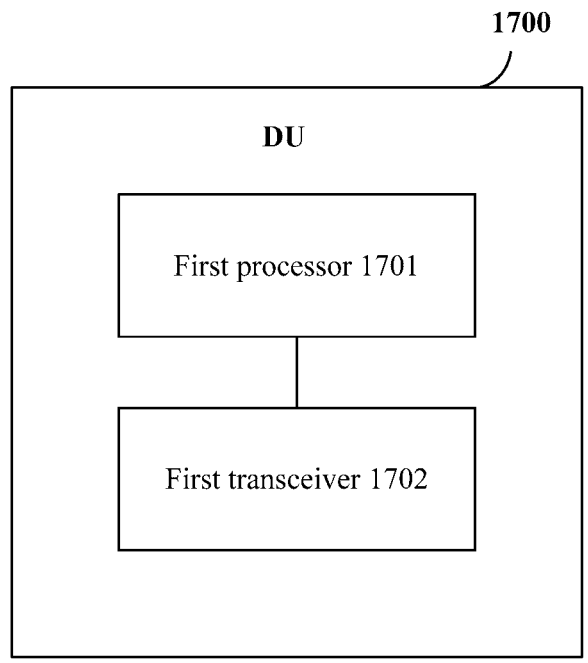
FIG. 17 is a structural diagram of a DU according to some embodiments of the present disclosure.

Referring to FIG. 17, a DU in an embodiment of the present disclosure includes a first processor 1701 and a first transceiver 1702.

The first processor 1701 is configured to: determine one or more TNL addresses of a CU; and establish multiple TNL associations between the DU and the CU according to the one or more TNL addresses.

In the embodiment of the present disclosure, optionally, the first processor 1701 is further configured to establish a first TNL association according to the one TNL address; the first transceiver 1702 is configured to receive a second TNL address according to the first TNL association; and the first processor 1701 is further configured to establish a second TNL association according to the second TNL address.

In the embodiment of the present disclosure, optionally, the first transceiver 1702 is further configured to: receive an F1 setup response message according to the first TNL association, where the F1 setup response message includes the second TNL address; or, receive a CU configuration update message, where the CU configuration update message includes the second TNL address.

In the embodiment of the present disclosure, optionally, the first transceiver 1702 is further configured to receive an update request message for updating a TNL association of the DU; and the first processor 1701 is further configured to update the TNL association of the DU according to the update request message.

In the embodiment of the present disclosure, optionally, the first transceiver 1702 is further configured to: receive an F1 setup response message, where the F1 setup response message includes the update request message instructing an update of the TNL association of the DU; or, receive a CU configuration update message, where the CU configuration update message includes the update request message instructing an update of the TNL association of the DU.

In the embodiment of the present disclosure, optionally, the first processor 1701 is further configured to determine one or more TNL addresses of the CU that are configured by OAM.

The DU provided in the embodiment may perform the foregoing method embodiments and has similar implementation principles and technical effects. Details are not described herein again in the embodiment.

The present disclosure further provides in some embodiments a DU. Because the principle of resolving the problem by the DU is similar to that of the association handling method in the embodiments of the present disclosure, for the implementation of the DU, reference may be made to the implementation of the method. Details are not described herein again in the embodiment.

Figure 18:
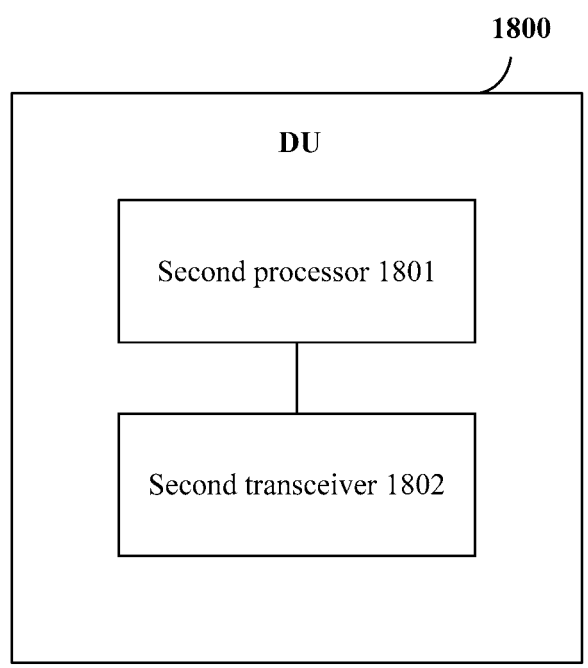
FIG. 18 is a structural diagram of a DU according to some embodiments of the present disclosure.

Referring to FIG. 18, a DU in an embodiment of the present disclosure includes a second processor 1801 and a second transceiver 1802, where the second transceiver 1802 is configured to: receive a signaling transmitted by a CU and used to notify that the CU updates or releases a binding relationship between the F1 AP signaling and a TNL.

In the embodiment of the present disclosure, optionally, the second transceiver 1802 is further configured to receive a first signaling, where the first signaling includes an identifier of updating the binding relationship between the F1 AP signaling and the TNL.

In the embodiment of the present disclosure, optionally, the second transceiver 1802 is further configured to receive a second signaling dedicated to updating the binding relationship between F1 AP signaling and a TNL.

In the embodiment of the present disclosure, optionally, the second transceiver 1802 is further configured to transmit a third signaling to the CU by using a third TNL association; and the second transceiver 1802 is further configured to receive a fourth signaling transmitted by the CU in response to the third signaling by using a fourth TNL association.

In the embodiment of the present disclosure, optionally, the second transceiver 1802 is further configured to receive a fifth signaling transmitted by the CU, where the fifth signaling includes a message for releasing a binding between the F1 AP signaling and a fifth TNL association.

In the embodiment of the present disclosure, optionally, if a UE-unrelated signaling is used to notify the DU, it is indicated that an F1 AP signaling bound with the fifth TNL association is to be released; or if a UE-related signaling is used to notify the DU, it is indicated that an F1 AP signaling bound with the fifth TNL association that is related to the UE is to be released. In the embodiment of the present disclosure, optionally, the second transceiver 1802 is further configured to receive a sixth signaling transmitted by the CU, where a sixth TNL association field in the sixth signaling is set to null, and the sixth TNL association field being set to null indicates that the CU releases an F1 AP signaling bound with the sixth TNL association.

The DU provided in the embodiment may perform the foregoing method embodiments and has similar implementation principles and technical effects. Details are not described herein again in the embodiment.

The present disclosure further provides in some embodiments a CU. Because the principle of resolving the problem by the CU is similar to that of the association handling method in the embodiments of the present disclosure, for the implementation of the CU, reference may be made to the implementation of the method. Details are not described herein again in the embodiment.

Figure 19:
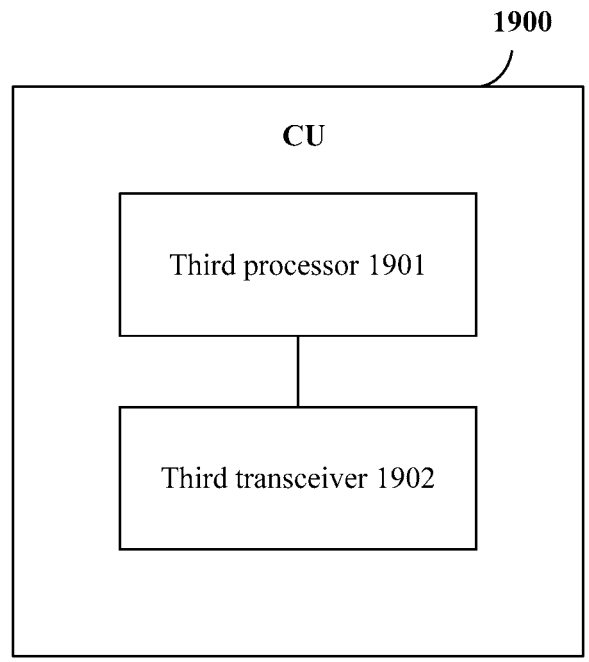
FIG. 19 is a structural diagram of a CU according to some embodiments of the present disclosure.

Referring to FIG. 19, a CU in an embodiment of the present disclosure includes a third processor 1901 and a third transceiver 1902.

The third transceiver 1902 is configured to notify a DU that the CU updates or releases a binding relationship between an F1 AP signaling and a TNL.

In the embodiment of the present disclosure, optionally, the third transceiver 1902 is further configured to: transmit a first signaling to the DU, where the first signaling includes an identifier of updating the binding relationship between the F1 AP signaling and the TNL; or transmit a second signaling dedicated to updating the binding relationship between the F1 AP signaling and a TNL to the DU.

In the embodiment of the present disclosure, optionally, the third transceiver 1902 is further configured to receive a third signaling transmitted by the DU by using a third TNL association; and the third transceiver 1902 is further configured to transmit a fourth signaling in response to the third signaling to the DU by using a fourth TNL association, where the fourth signaling is used for instructing the DU to update the binding relationship between the F1 AP signaling and a TNL according to the fourth signaling.

In the embodiment of the present disclosure, optionally, the third transceiver 1902 is further configured to:

notify, by using a signaling, the DU that the CU releases the binding relationship between the F1 AP signaling and a TNL.

In the embodiment of the present disclosure, optionally, the third transceiver 1902 is further configured to transmit a sixth signaling to the DU, where a sixth TNL association field in the sixth signaling is set to null, and the sixth TNL association field being set to null indicates that the CU releases an F1 AP signaling bound with the sixth TNL association.

The CU provided in the embodiment may perform the foregoing method embodiments and has similar implementation principles and technical effects. Details are not described herein again in the embodiment.

Figure 20:
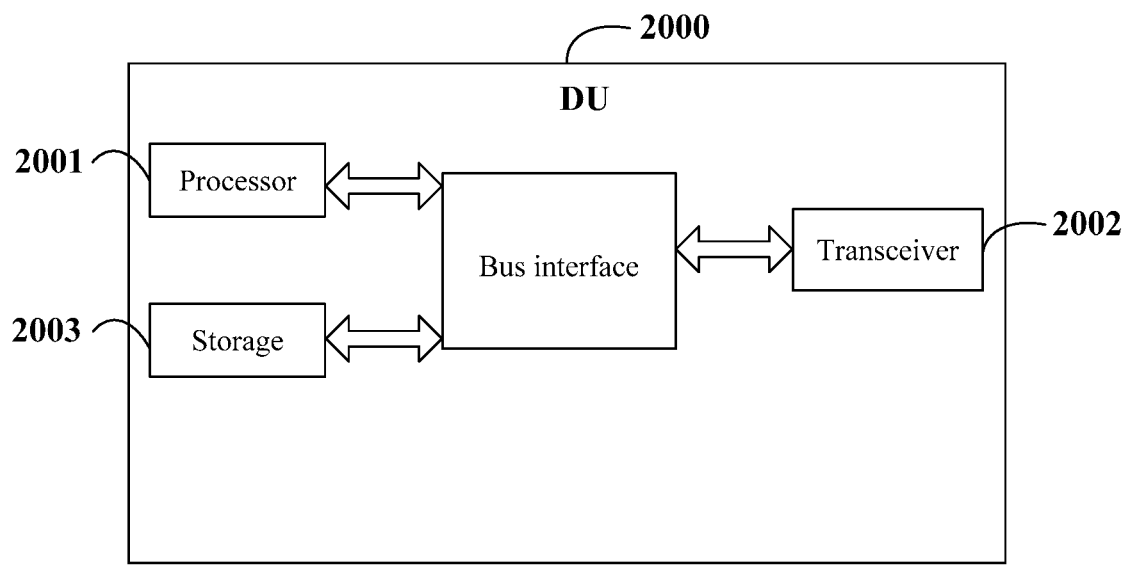
FIG. 20 is another structural diagram of a DU according to some embodiments of the present disclosure.

FIG. 20 is a structural diagram of a DU to which an embodiment of the present disclosure is applied. As shown in FIG. 20, a DU 2000 includes a processor 2001, a transceiver 2002, a storage 2003, and a bus interface.

In the embodiment of the present disclosure, the DU 2000 further includes a computer program stored in the storage 2003 and configured to be executed by the processor 2001, where the computer program is configured to be executed by the processor 2001 to implement the following steps: determining one or more TNL addresses of a CU; and establishing multiple TNL associations between the DU and the CU according to the one or more TNL addresses.

In FIG. 20, a bus architecture may include any quantity of interconnected buses and bridges. Specifically, various circuits such as one or more processors represented by the processor 2001 and a storage represented by the storage 2003 are linked together. The bus architecture may also link various other circuits such as peripherals, voltage regulators, and power management circuits, which are well known in the art, and therefore are not further described herein. The bus interface provides an interface. The transceiver 2002 may include multiple elements, that is, a transmitter and a receiver, to provide units for communicating with various other apparatuses over a transmission medium.

The processor 2001 is responsible for managing the bus architecture and general processing, and the storage 2003 may store data used when the processor 2001 performs an operation.

Optionally, the computer program is configured to be executed by the processor 2001 to further implement the following steps: establishing a first TNL association according to the one TNL address; receiving a second TNL address according to the first TNL association; and establishing a second TNL association according to the second TNL address.

Optionally, the computer program is configured to be executed by the processor 2001 to further implement the following step: receiving an F1 setup response message according to the first TNL association, where the F1 setup response message includes the second TNL address; or, receiving a CU configuration update message according to the first TNL association, where the CU configuration update message includes the second TNL address.

Optionally, the computer program is configured to be executed by the processor 2001 to further implement the following steps: receiving an update request message for updating a TNL association of the DU; and updating the TNL association of the DU according to the update request message.

Optionally, the computer program is configured to be executed by the processor 2001 to further implement the following step: receiving an F1 setup response message, where the F1 setup response message includes the update request message instructing an update of the TNL association of the DU; or, receiving a CU configuration update message, where the CU configuration update message includes the update request message instructing an update of the TNL association of the DU.

Optionally, the computer program is configured to be executed by the processor 2001 to further implement the following step: receiving a first signaling, where the first signaling includes an identifier of updating a binding relationship between the F1 AP signaling and a TNL.

Optionally, the computer program is configured to be executed by the processor 2001 to further implement the following step: receiving a second signaling dedicated to updating the binding relationship between the F1 AP signaling and a TNL.

Optionally, the computer program is configured to be executed by the processor 2001 to further implement the following steps: transmitting a third signaling to the CU by using a third TNL association; and receiving a fourth signaling transmitted by the CU in response to the third signaling by using a fourth TNL association.

Optionally, the computer program is configured to be executed by the processor 2001 to further implement the following step: receiving a fifth signaling transmitted by the CU by using a fifth TNL association, where the fifth signaling includes a message for releasing the binding between the F1 AP signaling and a TNL.

Optionally, the computer program is configured to be executed by the processor 2001 to further implement the following step: receiving a sixth signaling transmitted by the CU, where a sixth TNL association field in the sixth signaling is set to null.

Figure 21:
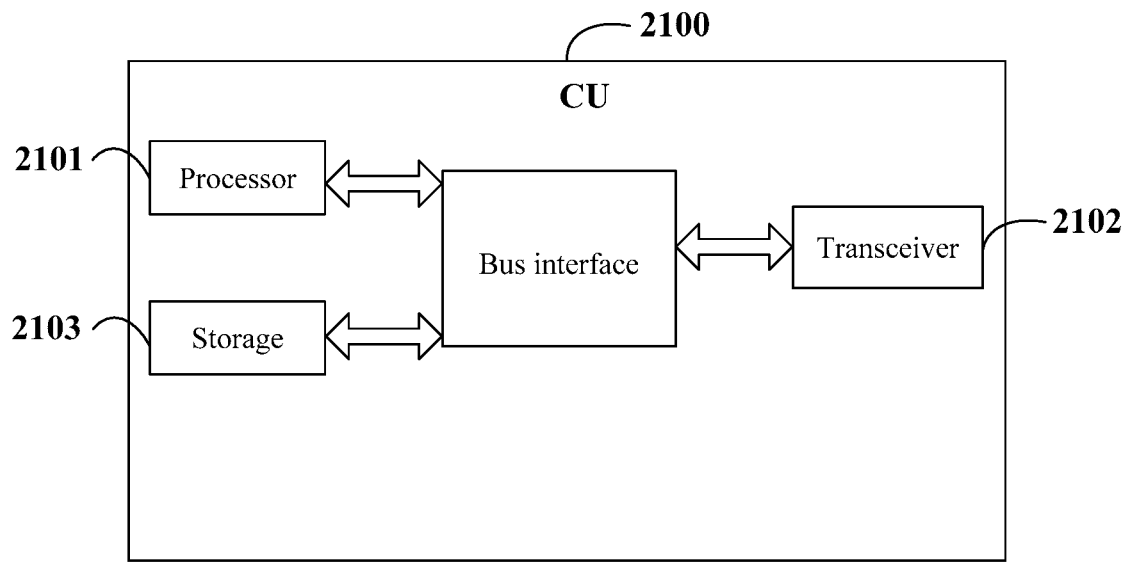
FIG. 21 is another structural diagram of a CU according to some embodiments of the present disclosure.

FIG. 21 is a structural diagram of a CU to which an embodiment of the present disclosure is applied. As shown in FIG. 21, a CU 2100 includes a processor 2101, a transceiver 2102, a storage 2103, and a bus interface.

In the embodiment of the present disclosure, the CU 2100 further includes a computer program stored in the storage 2103 and configured to be executed by the processor 2101, where the computer program is configured to be executed by the processor 2101 to implement the following step: notifying a DU that the CU updates or releases a binding relationship between an F1 AP signaling and a TNL.

In FIG. 21, a bus architecture may include any quantity of interconnected buses and bridges. Specifically, various circuits such as one or more processors represented by the processor 2101 and a storage represented by the storage 2103 are linked together. The bus architecture may also link various other circuits such as peripherals, voltage regulators, and power management circuits, which are well known in the art, and therefore are not further described herein. The bus interface provides an interface. The transceiver 2102 may include multiple elements, that is, a transmitter and a receiver, to provide units for communicating with various other apparatuses over a transmission medium.

The processor 2101 is responsible for managing the bus architecture and general processing, and the storage 2103 may store data used when the processor 2101 performs an operation.

Optionally, the computer program is configured to be executed by the processor 2101 to further implement the following step: transmitting a first signaling to the DU, where the first signaling includes an identifier of updating the binding relationship between the F1 AP signaling and the TNL; or, transmitting a second signaling dedicated to updating the binding relationship between F1 AP signaling and a TNL to the DU.

Optionally, the computer program is configured to be executed by the processor 2101 to further implement the following steps: receiving a third signaling transmitted by the DU by using a third TNL association; and transmitting a fourth signaling in response to the third signaling to the DU by using a fourth TNL association, where the fourth signaling is used for instructing the DU to update the binding relationship between the F1 AP signaling and a TNL according to the fourth signaling.

Optionally, the computer program is configured to be executed by the processor 2101 to further implement the following step: notifying, by using a signaling, the DU that the CU releases the binding relationship between F1 AP signaling and a TNL.

Optionally, the computer program is configured to be executed by the processor 2101 to further implement the following step: transmitting a sixth signaling to the DU, where a sixth TNL association field in the sixth signaling is set to null, and the sixth TNL association field being set to null indicates that the CU releases an F1 AP signaling bound with the sixth TNL association.

Figure 22:
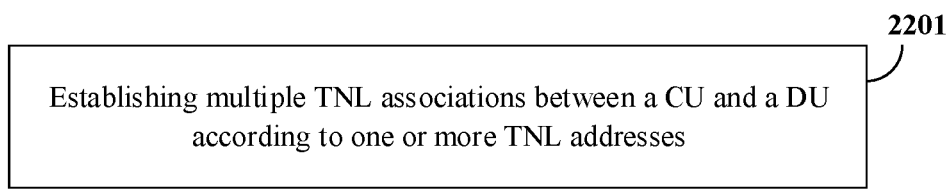
FIG. 22 is an eleventh flowchart of an association handling method according to some embodiments of the present disclosure.

FIG. 22 shows a procedure of an association handling method applied to a CU and the procedure includes specific steps as follows.

A step 2201 includes: establishing multiple TNL associations between the CU and a DU according to one or more TNL addresses.

Optionally, in the embodiment of the present disclosure, in step 2201, a first TNL association with the DU is established according to the one TNL address; a second TNL address is transmitted to the DU according to the first TNL association; and a second TNL association is established according to the second TNL address.

Optionally, in the embodiment of the present disclosure, the second TNL address may be transmitted to the DU in the following manner:

transmitting an F1 setup response message to the DU according to the first TNL association, where the F1 setup response message includes the second TNL address; or transmitting a CU configuration update message to the DU according to the first TNL association, where the CU configuration update message includes the second TNL address.

Optionally, in the embodiment of the present disclosure, after step 2201, the method further includes: transmitting an update request message for updating a TNL association of the DU to the DU.

Specifically, an F1 setup response message is transmitted to the DU, where the F1 setup response message includes the update request message instructing an update of the TNL association of the DU; or a CU configuration update message is transmitted to the DU, where the CU configuration update message includes the update request message instructing an update of the TNL association of the DU.

Therefore, multiple TNL associations are established between a CU and a DU to satisfy a future deployment requirement of 5G CUs in a cloud platform virtualization environment, and a user may select CU devices with different TNL addresses according to service requirements.

Figure 23:
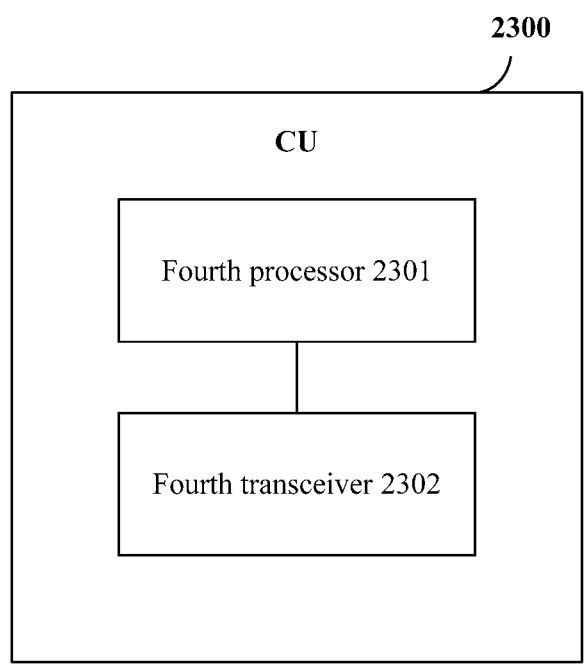
FIG. 23 is yet another structural diagram of a CU according to some embodiments of the present disclosure.

FIG. 23 shows the structure of a CU. A CU 2300 includes a fourth processor 2301 and a fourth transceiver 2302.

The fourth processor 2301 is configured to establish multiple TNL associations between the CU and a DU according to one or more TNL addresses.

In the embodiment of the present disclosure, optionally, the fourth processor 2301 is further configured to establish a first TNL association with the DU according to the one TNL address; the fourth transceiver 2302 is further configured to transmit a second TNL address to the DU according to the first TNL association; and the fourth processor 2301 is further configured to establish a second TNL association with the DU according to the second TNL address.

In the embodiment of the present disclosure, optionally, the fourth transceiver 2302 is further configured to: transmit an F1 setup response message to the DU according to the first TNL association, where the F1 setup response message includes the second TNL address; or, transmit a CU configuration update message to the DU according to the first TNL association, where the CU configuration update message includes the second TNL address.

In the embodiment of the present disclosure, optionally, the fourth transceiver 2302 is further configured to transmit an update request message for updating a TNL association of the DU to the DU.

In the embodiment of the present disclosure, optionally, the fourth transceiver 2302 is further configured to: transmit an F1 setup response message to the DU, where the F1 setup response message includes the update request message instructing an update of the TNL association of the DU; or, transmit a CU configuration update message to the DU, where the CU configuration update message includes the update request message instructing an update of the TNL association of the DU.

Therefore, multiple TNL associations are established between a CU and a DU to satisfy a future deployment requirement of 5G CUs in a cloud platform virtualization environment, and a user may select CU devices with different TNL addresses according to service requirements.

The present disclosure further provides in some embodiments a computer-readable storage medium storing therein a computer program, where the computer program is configured to be executed by a processor to implement the processes in the embodiments of the association handling method on a terminal, and the same technical effect can be achieved. To avoid repetition, details are not described herein again. The computer-readable storage medium may be, for example, a read-only memory (ROM), a random access memory (RAM), a magnetic disk, an optical disc or the like.

It should be noted that "one embodiment" or "an embodiment" described throughout the specification indicate that at least one embodiment of the present disclosure includes particular features, structures or characteristics related to the embodiments. Therefore, "one embodiment" or "an embodiment" that appears throughout the specification do not necessarily refer to the same embodiment. Moreover, these particular features, structures or characteristics may be combined in any appropriate manner in one or more embodiments.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

In addition, the terms "system" and "network" can usually be used interchangeably herein.

It should be noted that the term "and/or" in this document is only to describe an association relationship of associated objects, and represents that three kinds of relationships may exist, for example, A and/or B may represent the following three cases: A exists alone, both A and B exist, and B exists alone. In addition, the symbol "/" in this document usually represents that the former and latter objects associated are in an "or" relationship.

In the embodiments provided in the present application, it should be understood that "B corresponding to A" indicates that B is associated with A, and B may be determined according to A. However, it should further be understood that "B is determined according to A" does not necessarily indicate "B is determined according to only A", and B may be determined according to A and/or other information.

In several embodiments provided in the present application, it should be understood that the disclosed method and device may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections or connections in other forms.

In addition, functional units in the embodiments of the present disclosure may be integrated into one processing unit, or each of the units may exist alone physically, or two or more units are integrated into one unit. The integrated unit may be implemented in the form of hardware or a software functional unit in addition to hardware.

When the foregoing integrated unit is implemented in a form of a software functional unit, the software functional unit may be stored in a computer-readable storage medium. The software functional unit is stored in the storage medium and includes several instructions for instructing a computer device (which may be a personal computer, a server or a network side device) to perform some of the steps of the association handling method described in the embodiments of the present disclosure. The storage medium includes various media that can store program code, such as a USB flash drive, a removable hard disk, a read-only memory (ROM), a random access memory (RAM), a magnetic disk, or an optical disc.

The foregoing descriptions are preferred implementations of the present disclosure. It should be noted that improvements and modifications may be made in the embodiments by a person skilled in the art without departing from the principle of the present disclosure. These improvements and modifications also fall within the scope of the present disclosure.

What is claimed is:

1. An association handling method, applied to a distributed unit (DU), comprising:
   determining one or more transport network layer (TNL) addresses of a central unit (CU); and establishing multiple TNL associations between the DU and the CU according to the one or more TNL addresses;
   wherein the establishing the multiple TNL associations between the DU and the CU according to the one TNL address comprises:
   establishing a first TNL association according to the one TNL address;
   receiving a second TNL address according to the first TNL association; and
   establishing a second TNL association according to the second TNL address;
   wherein the receiving the second TNL address according to the first TNL association comprises:
   receiving a list transmitted by the CU, wherein the list comprises TNL addresses corresponding to one or more CUs;
   wherein the method further comprises:
   receiving a signaling transmitted by the CU, the signaling notifying that the CU updates or releases a binding relationship between a TNL association and an F1 application layer (F1-AP) UE-related signaling or an F1-AP UE-unrelated signaling;
   wherein the F1-AP UE-related signaling is an F1-AP signaling that relates to a UE, and the F1-AP UE-unrelated signaling is an F1-AP signaling that does not relate to the UE.

2. The method according to claim 1, wherein the receiving the second TNL address according to the first TNL association comprises:
   receiving an F1 setup response message according to the first TNL association, wherein the F1 setup response message comprises the second TNL address; or receiving a CU configuration update message according to the first TNL association, wherein the CU configuration update message comprises the second TNL address.

3. The method according to claim 1, further comprising: receiving an update request message for updating a TNL association of the DU; and updating the TNL association of the DU according to the update request message.

4. The method according to claim 3, wherein the receiving the update request message for updating the TNL association of the DU comprises:
   receiving an F1 setup response message, wherein the F1 setup response message comprises the update request message instructing an update of the TNL association of the DU; or
   receiving a CU configuration update message, wherein the CU configuration update message comprises the update request message instructing an update of the TNL association of the DU.

5. An association handling method, applied to a central unit (CU), comprising:
   establishing multiple transport network layer (TNL) associations between the CU and a distributed unit (DU) according to one or more TNL addresses;
   wherein the establishing the multiple TNL associations between the CU and the DU according to the one or more TNL addresses comprises:
   establishing a first TNL association with the DU according to the one TNL address;
   transmitting a second TNL address to the DU according to the first TNL association; and
   establishing a second TNL association with the DU according to the second TNL address;
   wherein the transmitting the second TNL address to the DU according to the first TNL association comprises:
   transmitting a list to the DU, wherein the list comprises TNL addresses corresponding to one or more CUs;
   wherein the method further comprises:
   notifying the DU that the CU updates or releases a binding relationship between a TNL association and an F1 application layer (F1-AP) UE-related signaling or an F1-AP UE-unrelated signaling;
   wherein the F1-AP UE-related signaling is an F1-AP signaling that relates to a UE, and the F1-AP UE-unrelated signaling is an F1-AP signaling that does not relate to the UE.

6. The method according to claim 5, wherein the transmitting the second TNL address to the DU according to the first TNL association comprises:

transmitting an F1 setup response message to the DU according to the first TNL association, wherein the F1 setup response message comprises the second TNL address; or transmitting a CU configuration update message to the DU according to the first TNL association, wherein the CU configuration update message comprises the second TNL address.

7. The method according to claim 5, further comprising: transmitting an update request message for updating a TNL association of the DU to the DU.

8. The method according to claim 7, wherein the transmitting the update request message for updating the TNL association of the DU to the DU comprises:

transmitting an F1 setup response message to the DU, wherein the F1 setup response message comprises the update request message instructing an update of the TNL association of the DU; or transmitting a CU configuration update message to the DU, wherein the CU configuration update message comprises the update request message instructing an update of the TNL association of the DU.

9. The method according to claim 1, wherein the receiving the signaling transmitted by the CU and used to notify that the CU updates or releases the binding relationship comprises:

receiving a first signaling transmitted by the CU, wherein the first signaling comprises an identifier of updating the binding relationship;

or, receiving a second signaling transmitted by the CU and dedicated to updating the binding relationship;

or, transmitting a third signaling to the CU by using a third TNL association; and receiving a fourth signaling transmitted by the CU in response to the third signaling by using a fourth TNL association.

10. The method according to claim 1, wherein the receiving the signaling transmitted by the CU and used to notify that the CU releases the binding relationship comprises:

receiving a fifth signaling, wherein the fifth signaling comprises a message for releasing a binding relationship between an F1 AP signaling and a fifth TNL association, wherein if a UE-unrelated signaling is used to notify the DU, it is indicated that an F1 AP signaling bound with the fifth TNL association is to be released; or if a UE-related signaling is used to notify the DU, it is indicated that an F1 AP signaling bound with the fifth TNL association that is related to the UE is to be released;

or, receiving a sixth signaling, wherein a sixth TNL association field in the sixth signaling is set to null, and the sixth TNL association field being set to null indicates that the CU releases an F1 AP signaling bound with the sixth TNL association.

11. The method according to claim 5, wherein the notifying the DU that the CU updates the binding relationship comprises:

transmitting a first signaling to the DU, wherein the first signaling comprises an identifier of updating the binding relationship; or transmitting to the DU a second signaling dedicated to updating the binding relationship;

or, receiving a third signaling transmitted by the DU by using a third TNL association; and transmitting a fourth signaling in response to the third signaling to the DU by using a fourth TNL association, wherein the fourth signaling is used for instructing the DU to update the binding relationship according to the fourth signaling.

12. The method according to claim 5, wherein the notifying the DU that the CU releases the binding relationship comprises: notifying, by using a signaling, the DU that the CU releases the binding relationship;

or, transmitting a sixth signaling to the DU, wherein a TNL association field in the sixth signaling is set to null, and the sixth TNL association field being set to null indicates that the CU releases an F1 AP signaling bound with the sixth TNL association.

13. A distributed unit (DU), comprising: a processor, a storage, and a computer program stored in the storage and configured to be executed by the processor, wherein the processor is configured to execute the computer program, to implement the steps in the association handling method according to claim 1.

14. A central unit (CU), comprising: a processor, a storage, and a computer program stored in the storage and configured to be executed by the processor, wherein the processor is configured to execute the computer program, to implement the steps in the association handling method according to claim 5.

15. The method according to 1, wherein the CU is a first CU instance, and the establishing a second TNL association according to the second TNL address comprises:

establishing, according to the second TNL address, TNL associations with a second CU instance and a third CU instance in a case that the second TNL address comprises TNL addresses of the second CU instance and the third CU instance.

16. The method according to 6, wherein the CU is a first CU instance, and the establishing a second TNL association with the DU according to the second TNL address comprises:

causing the DU to establish TNL associations with a second CU instance and a third CU instance according to the second TNL address, in a case that the second TNL address comprises TNL addresses of the second CU instance and the third CU instance.

* * * * *